United States Patent [19]

Wheaton et al.

[11] 4,229,296
[45] Oct. 21, 1980

[54] WET OXIDATION SYSTEM EMPLOYING PHASE SEPARATING REACTOR

[75] Inventors: Robert B. Wheaton, St. Joseph, Mich.; James W. Van Kirk, Evansville, Ind.

[73] Assignee: Whirlpool Corporation, Benton Harbor, Mich.

[21] Appl. No.: 930,492

[22] Filed: Aug. 3, 1978

[51] Int. Cl.$^2$ .............................................. C02C 5/04
[52] U.S. Cl. ................................... 210/758; 210/104; 210/120; 210/177; 210/180; 210/182; 210/202
[58] Field of Search ............... 210/63 R, 71, 200, 201, 210/198 R, 199, 252, 258, 218, 175, 177, 180, 182, 73 R, 104, 120, 137

[56] References Cited

U.S. PATENT DOCUMENTS

| | | | |
|---|---|---|---|
| 2,824,058 | 2/1958 | Zimmermann | 210/63 R |
| 2,903,425 | 7/1959 | Zimmermann | 210/63 R |
| 2,944,396 | 7/1960 | Barton et al. | 210/63 R |
| 3,649,534 | 3/1972 | Schotte | 210/63 R |
| 3,661,778 | 5/1972 | Pradt | 210/63 R |
| 3,761,409 | 9/1973 | McCoy et al. | 210/63 R |
| 3,920,506 | 11/1975 | Morgan | 210/63 R |
| 4,100,730 | 7/1978 | Pradt | 210/63 R |

*Primary Examiner*—Benoit Castel
*Attorney, Agent, or Firm*—Hill, Van Santen, Steadman, Chiara & Simpson

[57] ABSTRACT

Processes are provided for accomplishing wet oxidation using a reaction zone wherein the gas phase (oxygen) is allowed to pass therethrough at a flow rate independent of the liquid phase (waste water) flow rate so that more oxygen can be supplied to a given volume of waste water than is possible for a conventional reactor of the equivalent size. A high efficiency wet oxidation is provided by which the process technology can be practiced either in a single stage or multistage. The reactor is directed to operate at temperatures ranging from about 350° to 600° F. at pressures ranging from about 800 to 2200 psig and the reactor provides a gas phase/liquid phase separation feature.

7 Claims, 3 Drawing Figures

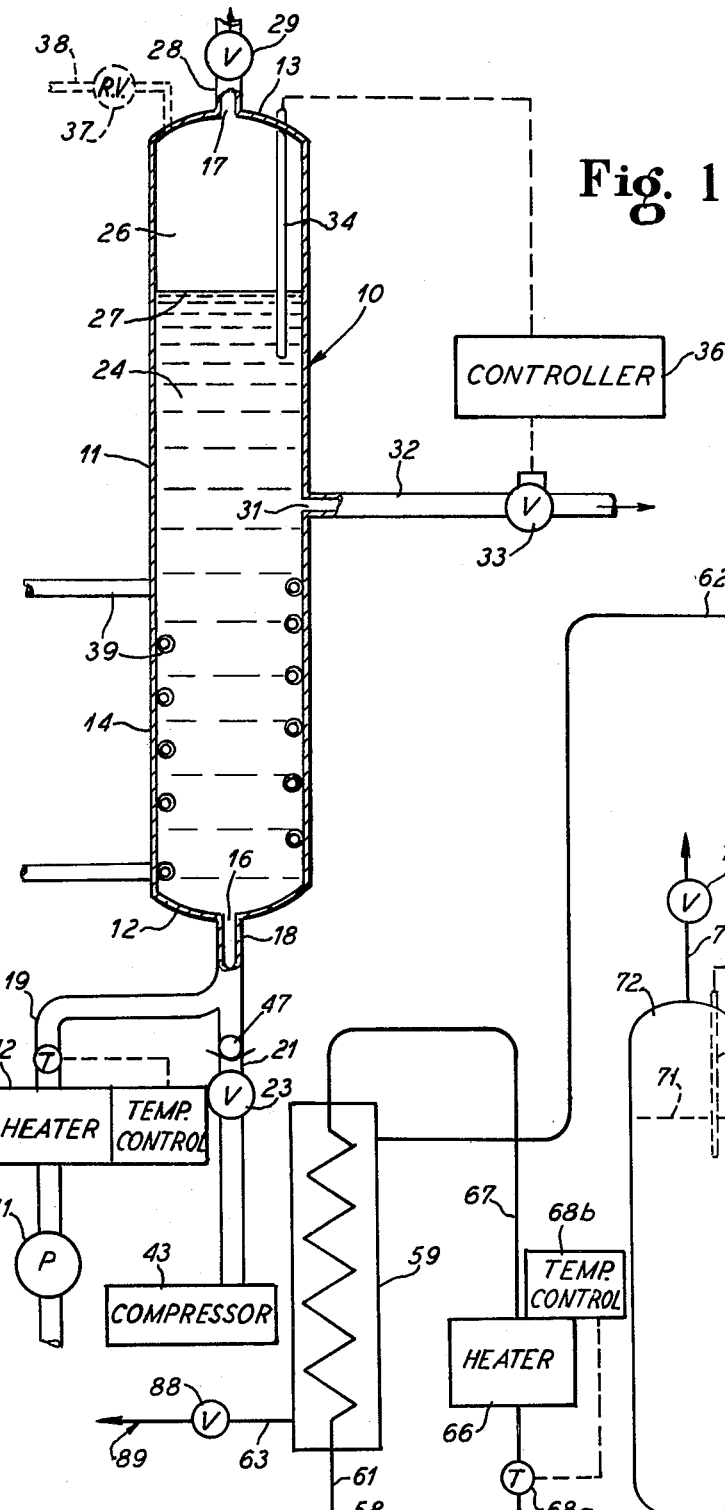
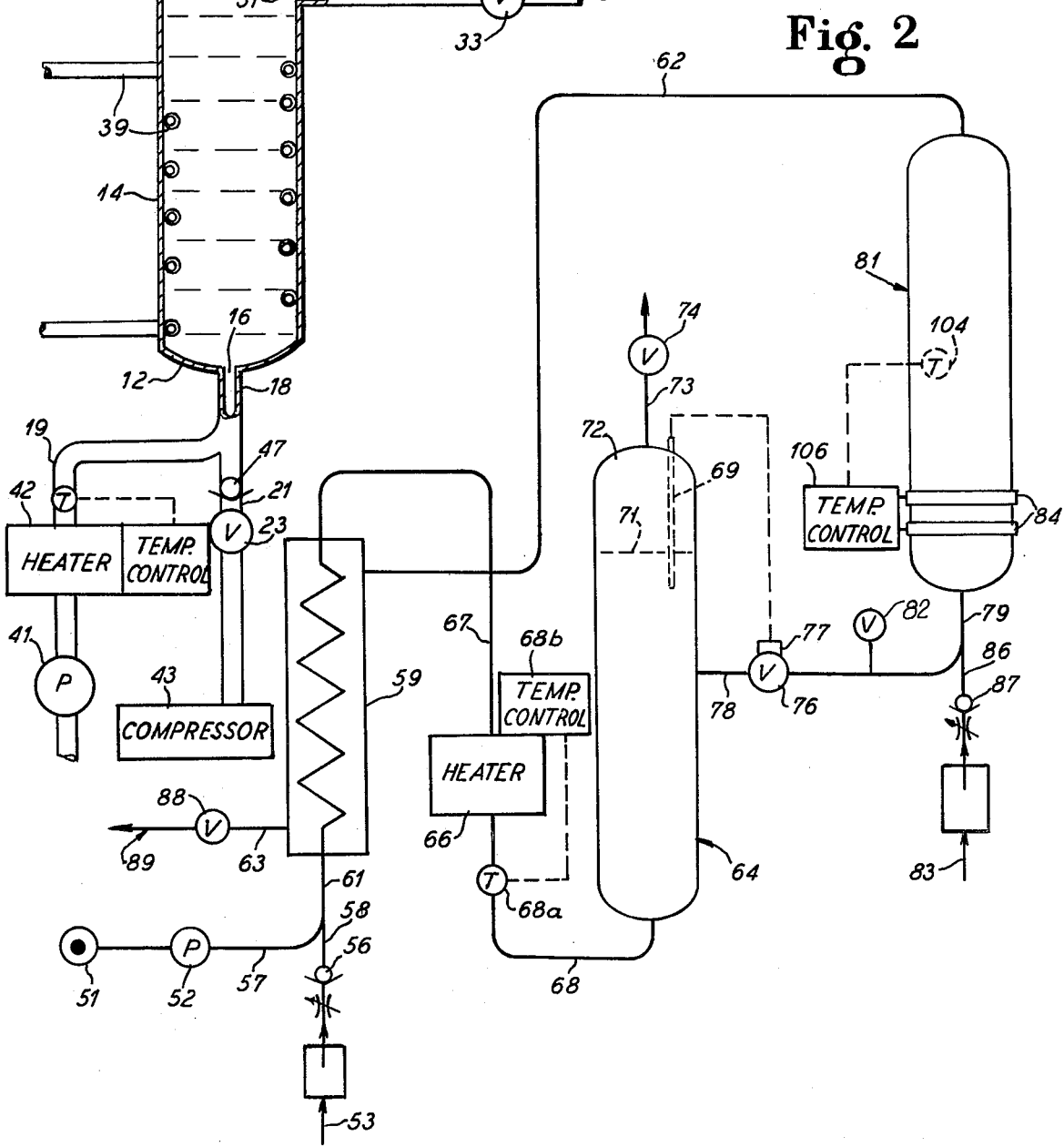
Fig. 1
Fig. 2

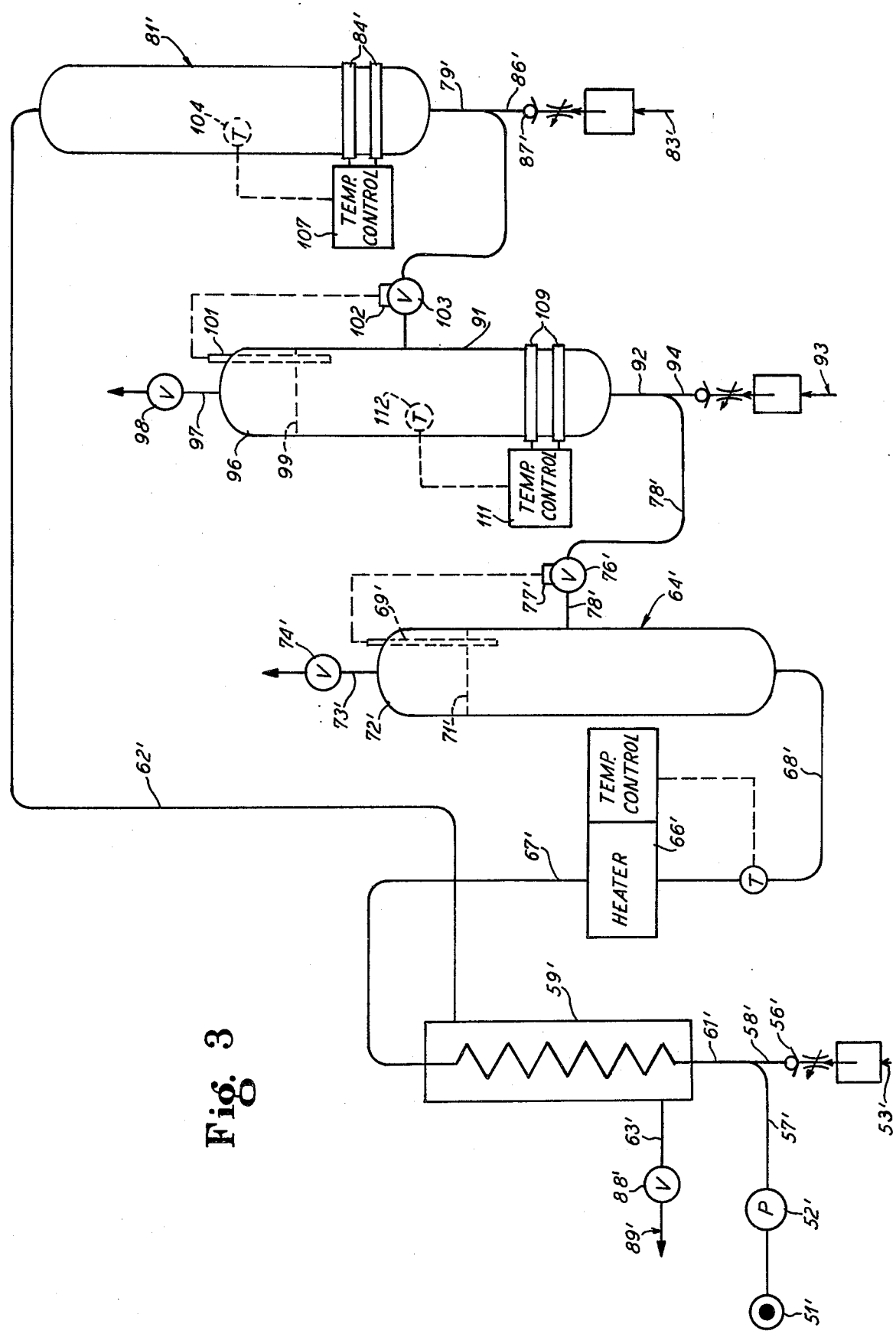

WET OXIDATION SYSTEM EMPLOYING PHASE SEPARATING REACTOR

BACKGROUND OF THE INVENTION

In conventional reactors heretofore employed for wet oxidation, the gas phase is not separated from the liquid phase. Consequently, the oxygen which can be supplied to a given volume of waste water being charged to the reaction zone is limited. With prior art reactors about 60 to 65% chemical oxygen demand (COD) removal is typically accomplished at about 500° F. within a few minutes of reaction time.

It would be desirable to increase the wet oxidation efficiency to substantially higher levels of COD removal with the same reaction time and temperature.

BRIEF SUMMARY OF THE INVENTION

More particularly, the present invention relates to wet oxidation processes by which significant increases in reactor oxidation efficiency are possible through the use of single stage or multi-stage reaction zones wherein the gas phase (oxygen containing) is allowed to pass through at a flow rate independent of that associated with the liquid phase (waste water containing). Consequently, more oxygen can be supplied to a given volume of waste water than would be possible for a conventional reactor of equal size, so that at a given reactor time and temperature, higher COD removal for a given waste water is achievable. The increased wet oxidation efficiency is believed to be related to continuous removal of excess carbon dioxide from individual reaction zones, though there is no intent herein to be bound by theory.

In one aspect, the present invention relates to a process for accomplishing wet oxidation utilizing a single reaction zone in relation to which a plurality of steps are simultaneously and continuously performed, as more particularly hereinafter described.

In another aspect, the present invention relates to a wet oxidation reactor that results in a significant increase in reactor efficiency. The reactor consists of a cylindrical pressure vessel mounted in a vertical position with ports at the top, bottom and side. Associated valves and a water level sensor are utilized.

In another aspect, the present invention relates to a multi-stage wet oxidation system employing high pressure pump means, air compressor means, heat exchanger means, heater means and two or more of the reactors of this invention connected to one another in series. Waste organic matter in water charged to the system at elevated temperatures and pressures in the presence of heated compressed air is oxidized to carbon dioxide and water progressively in each reactor stage. The end result is a greater removal of waste organic matter than can be achieved in a single stage reactor system.

Various objects, purposes, advantages, aims, utilities, features, embodiments and the like will be apparent to those skilled in the art from a reading of the present specification, taken together with the drawings.

BRIEF DESCRIPTION OF THE DRAWINGS

In the drawings:

FIG. 1 is a vertical sectional diagrammatic view of one embodiment of a reactor of the present invention;

FIG. 2 diagrammatically illustrates a two-stage wet oxidation system of the present invention employing two reactors of FIG. 1; and FIG. 3 is a view similar to FIG. 2 but showing a multi-stage wet oxidation system employing three reactors of FIG. 1.

DETAILED DESCRIPTION

Referring to FIG. 1, there is seen a reactor 10 of the present invention which employs a vertically oriented (when the reactor 10 is in an operational configuration) elongated pressure vessel 11. Vessel 11 is cross-sectionally cylindrical in configuration as respects its side walls, and vessel 11 is provided at its opposite end portions with end plates 12 and 13 which are integrally secured to the side wall portions 14 thereof. The side wall protions 14 and the end plates 12 and 13 are conveniently formed of stainless steel or the like, with individual sections thereof welded together or the like, as desired, at positions of abutment or overlap.

The end plate 12 has an aperture 16 formed therein, and the end plate 13 similarly has an aperture 17 formed therein. Connected across aperture 16 to end plate 12 is a pipe 18 which, in turn, connects, as through a T type connector (not detailed) to pipes 19 and 21. Pipe 19 deliveres waste water containing entrained organic matter into pipe 18 and pipe 21 delivers an oxygen containing gas into pipe 18. Pipe 21 is provided with a flow control valve 23 so that a gas phase containing oxygen can pass into vessel 11 through aperture 16 at a flow rate which is independent of the flow rate associated with the liquid phase (waste water) entering the interior of vessel 11 through aperture 16.

In operation of reactor 10, aqueous liquid 24 accumulates within the interior of vessel 11. After entering the vessel 11, the oxygenated gas passes upwardly through the aqueous liquid 24 and the spent oxygen containing gas collects in a vapor dome 26 above the surface 27 of the aqueous liquid 24, and exits through aperture 17 in top end plate 13.

Connected to end plate 13 across aperture 17 is a pipe 28 which is provided with a pressure control valve 29 in generally adjacent relationship to the vessel 11.

The pressure control valve 29 allows gas and water vapor to bleed out of the vessel 11 at operating pressure. Valve 29 can be of any suitable known construction, such as a throttle valve. Valve 29 maintains pressure in the vessel 11 at a desired value, while separating spent air or other gas, carbon dioxide, and nitrogen from the liquid phase 24 by releasing these gases and vapors. The mixture of gas and water vapor leaving vessel 11 through pipe 28 can be condensed and the condensate handled separately, or the combined gas and water vapor (steam) can be vented to the atmosphere.

The aqueous liquid 24 leaves the vessel 11 through a side port 31 here illustratively shown as being located in a middle region of the vessel 11. A pipe 32 is engaged with the side wall portion 14 around the port 31 so that water processed in vessel 11 after entering port 31 travels through a pipe 32. A flow control valve 33 in pipe 32 controls the flow of aqueous liquid through a pipe 32.

The operation of valve 33 is controlled by a liquid level sensor 34 which extends interiorly into the vessel 11 (here through end plate 13). The sensor 34 is pre-set to maintain a given liquid level within vessel 11, within narrow, fixed limits. When the level of surface 27 rises, the sensor 34 generates a substantially instantaneous signal representative of the instantaneous liquid level in the vessel 11. Signals sensed by sensor 34 are fed to controller 36 so that when the liquid level 27 rises above a predetermined point the controller 36 operates to open the flow control valve 33, thereby permitting aqueous liquid 24 to flow out of the vessel 11, thus maintaining the desired liquid level there within. Aqueous liquid leaving vessel 11 can be cooled in a heat exchanger (not detailed) and reduced to atmospheric pressure or passed into a second reactor for a further treatment.

The pressure control valve 29 is provided with pressure sensor means (not detailed). Vessel 11 is preferably also provided with a safety pressure relief valve 37 which is connected by a pipe 38 in the embodiment shown to the end plate 13. The valve 37 may be set to open at a predetermined operating pressure within the vessel 11 should such pressure ever be reached in operation of the reactor 10.

In the operation, the interior of vessel 11 is maintained at a reaction zone temperature in the range from about 350° to 600° F., and at a reaction zone pressure in the range of from about 800 to 2200 psig. A desired zone of pressure is normally maintained by valve 29, as indicated. A desired zone temperature can be maintained by any convenient technique, such as by regulating flow control valve 23. Conveniently, but optionally, the vessel 11 can be provided, particularly in its lower regions, with an internal tube 39 coiled therein, or the like as desired, so that the tube 39 is in heat exchange relationship with the contents of vessel 11. Thus, a heat exchange fluid can be circulated therethrough as an aid in controlling a desired zone temperature within the vessel 11 during operation of the reactor 10. For example, during start-up, the vessel 11 can be pre-heated to some predetermined or desired extent by circulation of heating fluid through the tube 39. Similarly, during operation of the reactor 10, circulation of a cooling fluid through the tube 39 can be used to at least partly regulate the temperature within the vessel 11 during operation of the reactor 10.

In operation of reactor 10, the waste water is pre-heated to the operating zone temperature and the oxygen containing gas is pressurized to operating zone pressure before being charged through aperture 16 and entering vessel 11. For example, in the embodiment shown, the waste water is raised to the operating zone pressure by means of a pump 41 from which the now pressurized waste water is charged into a heater 42 before reaching the pipe 18. Similarly, the oxygen containing gas is compressed by compressor 43 which precedes the pipe 18. For safety reasons, pipe 21 is provided with a check valve 47, permitting only one-way flow from the compressor 43 into the pipe 18 of the respective waste water and oxygen containing gas. As those skilled in the art will appreciate, the heater 42 can comprise heat exchangers or the like as desired.

As the waste water and oxygen containing gas rise in the vessel 11 after entering the same, oxygen combines with the organic waste in the water. The subsequent oxidation results in conversion of organic waste to water, carbon dioxide, nitrogen and traces of organic compounds, such as low molecular weight organic acids. After the oxygen containing gas has moved through the aqueous liquid 24 and has collected in the vapor dome 26 above the level 27 of aqueous liquid 24, much of the oxygen entering the bottom of the reactor has been typically and preferably converted to carbon dioxide, which also collects in the vapor dome 26.

The reactor 10 allows the gas phase therein to pass through the vessel 11 at a flow rate which is independent of the flow rate associated with the liquid phase. Consequently, more oxygen can be supplied to a given volume of aqueous liquid undergoing wet oxidation than would be possible for a conventional reactor of equal size. The principal attributes of the reactor 10 concern its high efficiency as a wet oxidation reactor. If desired, 90 to 95% of the waste COD in a starting waste water charged to vessel 11 can be removed, for example, at 500° F. within a few minutes of reactor 10 operating time. This corresponds to about a 60 to 65% COD removal with the same reaction time and temperature in a conventional, non-vapor separating reactor of the prior art. The increased wet oxidation efficiency associated with the reactor 10 is believed to be related to continuous removal of excess carbon dioxide from the reaction zone in vessel 11.

In operating a reactor such as 10, one performs a plurality of steps simultaneously and continuously, particularly after a start-up. Thus, one charges waste water containing entrained organic matter to a bottom region of a vertically elongated reaction zone at a first flow rate. One also charges an oxygen containing gas to a bottom region of the reaction zone at a second flow rate.

One maintains the reaction zone at a zone temperature and at a zone pressure within the ranges above indicated. One removes gaseous effluent from a top region of the reaction zone at a rate sufficient to maintain the desired zone pressure. One removes aqueous liquid effluent from a middle region of the reaction zone at a rate sufficient to maintain the level of the aqueous liquid effluent in the reaction zone within narrow fixed limits above the middle region and below the top region thereof.

One pre-heats each of the waste water and the oxygen containing gas to the desired zone temperature before the above indicated chargings occur, and also one pre-pressurizes each of the waste water and the oxygen containing gas to the desired zone pressure before such respective chargings.

Preferably, in the practice of the process aspect of this invention using a reactor such as reactor 10, the amount of oxygen so charged is at least sufficient to accomplish about an 80% COD removal from entrained organic matter present in the waste water charged, and more preferably at least about a 90% COD removal.

If desired, the vessel 11 can be charged, particularly in the lower portions thereof, with a wet oxidation catalyst so as to enhance the efficiency of wet oxidation within the reactor 10. For this purpose, the wet oxidation catalysts known to the prior art can be employed.

As indicated above, the aqueous liquid removed from a reactor 10 can be passed into a second reactor for further treatment. Referring to FIG. 2, there is seen a multi-stage embodiment of a wet oxidation system within the scope of the present invention. Water containing waste organic matter is passed through such system at elevated temperature and pressure in the presence of a compressed gas such as compressed air. The waste organic matter is oxidized to carbon dioxide and water progressively in each reactor stage. The end result is greater removal of waste organic matter than can be accomplished in a single stage reactor system.

The system operates at temperatures ranging from about 400° to 600° F., and at pressures ranging from about 1200 to 2200 psig. Sufficient oxygen is supplied, preferably as compressed air, to meet the stoichiometric requirements of the organic matter present in the waste water charged initially to the system.

In FIG. 2, waste water containing entrained organic matter enters the system at station 51 and is pumped up to system pressure of 1200 to 2200 psig by pump 52. Oxygen in the form of compressed air or the like is introduced into the system at station 53. Safety check valve 56 is provided in the gas line 58.

The waste water and air are heated in heat exchanger 59 to which such are charged via line 61, to which lines 57 and 58 join. Heat exchanger 59 is heated by hot liquid and gaseous effluent leaving the system, which effluent is charged to the heat exchanger 59 by line 62 from which the cooled stream exits via line 63. The mixed waste water and air are further heated to the desired reaction zone temperature in first-stage reactor 64 by pre-heater 66. Thus, the mixture of waste water and air leaves the heat exchanger 59 and passes through the pre-heater 66 via respective lines 67 and 68, with the line 68 charging the heated mixture into the first stage reactor 64. The line 68 includes a sensor 68a attached thereto associated with temperature control 68b for control of pre-heater 66.

The first stage reactor 64 is constructed in a manner similar to that described in relation to the reactor 10 above. A liquid level sensor 69 is used to establish and maintain a desired liquid level 71 in reactor 64 and allows the gas phase comprised of spent air and carbon dioxide to collect in the vapor dome 72 in the upper portion of the reactor 64. The gas phase in the vapor dome 72 is allowed to exit therefrom through line 73 within which is placed pressure control valve 74.

Valve 74 controls pressure in the first stage reactor 64. The spent gas and vapor exiting from the reactor 64 can be discharged to the atmosphere, can be expanded through a turbine or engine (not shown) to recover energy, can be used as a heat energy resource, or can be condensed (by condensers not shown) and a liquid condensate recycled back through the system.

In reactor 64, wet oxidation takes place. Generally the COD (chemical oxygen demand) of the waste water charged to the system is reduced by at least about 80% and preferably at least about 90% in reactor 64 by wet oxidation. Continuous removal of the spent air and carbon dioxide from the first stage reactor 64 promotes more complete COD removal than would be expected without such gas removal.

Optionally, the first stage reactor 64 can contain therein a catalyst bed.

The liquid level sensor 69 controls the operation of valve 76 via controller 77. Modulation of the valve 76 using the output signal from the liquid level sensor 69 maintains the liquid level in the first stage reactor 64 and allows the liquid stream removed from reactor 64 via line 78 to pass therethrough and enter line 79 which charges the second stage reactor, the safety valve 82 in line 78 after valve 76 is provided for safety reasons.

An oxygen containing gas in the form of fresh compressed air, is introduced into line 79 from station 83 in order to provide oxygen for the wet oxidation reaction in the second stage reactor 81.

A plurality of band heaters 84 may be provided circumferentially about the second stage reactor 81 in the lower region thereof in order to control the temperature desired in the second stage reactor 81 and to provide energy for heating and saturating the freshly compressed air introduced into line 79 from line 86 (the latter being equipped with a safety check valve 87).

First stage and second stage reaction temperatures can vary from one another by temperatures ranging from about 400° to 600° F. Typically and preferably, the second stage temperature is maintained at a value which is from about 50° to 100° F. higher than the first stage temperature and similarly for a 3rd stage.

The second stage reactor advantageously is interiorily packed with a suitable catalyst bed to promote a more rapid and complete oxidation of the organic matter in the aqueous liquid stream charged thereto. The catalyst can be any convenient wet oxidation catalyst known to the prior art.

Second stage reactor 81 is here comprised of a cylindrical pressure vessel mounted in a vertical position with charging ports at the bottom thereof and venting ports at the top thereof for respective lines 79 and 62. Mixed aqueous liquid, gas, and water vapor leave the second stage reactor 81 together via line 62 and pass through the heat exchanger 59, where most of their heat is exchanged to the incoming relatively cold waste water influent entering through line 61. The stream exits from heat exchanger 59 into line 63 and passes through the system pressure control valve 88. Valve 88 can be similar in structure to valves 29 and 74 and valve 88 maintains system pressure on the second stage reactor 81 and the effluent side of the heat exchanger 59. Purified liquid exits the system via line 89 downstream of valve 88.

The second stage system pressure is maintained at about 100 to 200 psig below that of the first stage pressure. This provides a pressure differential to move the liquid through the second stage reactor 81 and heat exchanger 59. If a third stage is used a similar arrangement is employed.

Cool oxidized effluent aqueous liquid, spent air and gas, plus carbon dioxide are discharged from the system at line 89 at ambient pressures.

The two-stage system shown in FIG. 2 allows a more complete wet oxidation of waste waters containing COD levels, e.g., above about 5000 milligrams per liter. Most of the organic matter entrained in the waste water is oxidized and the first stage reactor 64; thus, the waste water is reduced in its COD 80 to 90% in the first stage. Removal of spent air and carbon dioxide after the first stage reactor 64 with subsequent re-supply of fresh air for the second stage reactor 81 provides a more intense oxidation effect on the remaining waste organic materials in the second stage reactor charging liquid stream. COD removal efficiencies greater than 99% have been achieved on strong waste waters with this two-stage system.

The system of FIG. 2 can be expanded into three or more stages by introducing additional phase separating reactors serially and intermediately between the first stage reactor 64 and the last stage reactor 81. Each of the phase separating reactors employed requires fresh compressed air or other oxygen containing gas, auxiliary heaters, and a gas vapor discharge line or equivalent. Each of these reactors reduces the COD of the waste stream passing through it by about 90 to 95%.

An illustrative embodiment of a three-stage system is shown in FIG. 3. Here, components similar to those employed in the system of FIG. 2 are similarly numbered but with the addition of prime marks thereto. Here, the first stage reactor 64' and the reactor 81' have interconnected therebetween a second stage reactor 91, which in structure and operation is similar to reactor 10. The aqueous liquid being charged to reactor 91 comprises the liquid effluent from reactor 64', which is charged into reactor 91 via line 78' and line 92. Compressed, heated air is provided from a station 93, the temperature and pressure associated with such air being chosen so as to match the interior temperature and pressure being maintained in reactor 91. The air is fed into line 92 from line 94. Gas and vapor collecting in dome 96 are discharged therefrom via a line 97 through pressure control valve 98. The liquid level 99 in reactor 91 is maintained by the combination of level sensor 101, controller 102 and valve 103, valve 103 like valve 76', being constructed similarly to valve 33. Purified liquid exits the system via line 89 prime downstream of valve 88 prime.

In order to maintain in downstream reactors temperature conditions as desired and as described above, a temperature control arrangement is provided for each of the systems of FIGS. 2 and 3, respectively. Thus, referring to FIG. 2, the temperature in the interior of reactor 81 is sensed by temperature sensor 104 which generates a signal representative of the substantially instantaneous temperatures existing in the interior of the reactor 81. This signal is supplied to the temperature controller 106 which in turn regulates the amount of electrical energy fed to the electric band heaters 84, thereby maintaining the temperature in second stage reactor 81 in the range chosen between 50° to 100° F. higher than the first stage reactor 64. Similarly, in the system shown in FIG. 3, the band heaters 84' regulated by temperature controller 107 from the temperature prevailing in reactor 81' as sensed by temperature sensor 104 which is interconnected with controller 107. Similarly, the band heaters 109 circumferentially located about the bottom portion of reactor 91 are controlled by temperature controller 111 whose input signal is received from temperature sensor 112 located in the interior of reactor 91. In the system of FIG. 3, the second and third stage reactors are maintained in the range of from about 50° to 100° F. higher than each respective succeeding stage.

In general, the need for, and the advantages of, multi-stage systems depends on the initial COD level of the starting waste stream and the presence or absence of waste organic materials which are difficultly oxidizable under the conditions of wet oxidation. For example, a good single stage wet oxidation system of the present invention can reduce the COD level of a waste water stream from about 30,000 milligrams per liter to 1,500 milligrams per liter. A good two-stage system can reduce the same so-called strong waste water starting stream from such 30,000 milligram per liter value to 150 milligrams per liter, and a three-stage system can further reduce such stream to a value of about 8 milligrams per liter.

Suitable waste waters containing entrained organic matter can be sewage, sulfite waste liquors, canning factory effluent, slaughter house effluent, organic industrial waste, pulverized coal, mixtures thereof, and the like. The waste water can be in the form of an aqueous solution, particulate dispersion, colloidal suspension, or the like. The oxygen containing gas used as a starting material can be derived from any convenient source. Preferably, such a gas comprises from about 20 to 90 weight percent of oxygen with the balance up to 100 weight percent thereof being an inert gas. The gas used can comprise air or air enriched with oxygen. One suitable gas comprises from 0 to about 20 weight percent inert gas with the balance up to 100 weight percent thereof being oxygen. Convenient inert gases can be those found in air, such as nitrogen, carbon dioxide, and the like.

In any given mode of practicing the present invention, as those skilled in the art will appreciate, the respective rates of starting waste water charging, starting gas charging, and effluent removal are selected so as to produce in the oxidation or reaction zone or zones, a residence time for the oxidizable components which is at least sufficient to achieve a desired extent of oxidation of the organic matter contained in the aqueous dispersion.

In the starting aqueous dispersion of waste water, the organic matter present can be in a solution or dispersed particle form. Conveniently, the starting aqueous waste water contains from about 0.8 to 3 weight percent of organic matter on a 100 weight percent total starting aqueous waste water basis.

After a reactant mixture is removed from the oxidation or reaction zone, gaseous components thereof are conveniently separated from liquid and suspended solid components. Thereafter, the pressure on the gaseous and liquid streams resulting is let down to atmosphere via control valve 88'.

The respective rates of waste water charging, oxygen containing gas charging, and effluent removal from a reaction zone are regulated so as to produce in such reaction zone a residence time for the components present therein, which is sufficient for generating a desired composition such as an approximately equilibrium composition of oxidizable components and oxidized components at the particular reaction zone temperature and zone pressure employed.

One class of wet oxidation catalysts which is presently preferred when catalysts are employed in the practice of the present invention comprises manganese oxide containing catalysts, particularly supported manganese oxide containing catalysts. Mixed oxides of manganese with other metals can be preferably used, such as copper manganese oxide, nickel manganese oxide, cobalt manganese oxide, and cerium manganese oxide, and the like as disclosed in the co-pending application of Wheaton, Nelson and Scherpereel, assigned to the same assignee as the present invention (U.S. Ser. No. 927,277 filed July 27, 1978). The size of the individual catalyst particles in a fixed catalyst bed employed in a reactor utilized in the practice of the present invention can vary widely. Conveniently, a catalyst bed for purposes of practicing the present invention can have a bulk density from about 9.7 to 18.4 pounds per cubic foot.

In a multi-stage wet oxidation system of this invention, the last stage incorporates a plug flow type reactor wherein a nearly or preferably substantially complete mixing in a transverse reaction zone (preferably radial) direction occurs, but which allows for no diffusion in the flow (preferably longitudinal) direction (i.e., little or preferably substantially no back mixing occurs). As a result, the velocity, temperature, and composition profiles are preferably about flat over any cross-sectional area perpendicular to the flow, but the composition of the reactant mixture therein varies along the flow path.

The last stage reactor can be of a construction generally known to the prior art of continuous reactors wherein reactants are introduced and products withdrawn simultaneously in a continuous manner. Such a reactor may have the shape of a tank, a tubular structure, or a tower, for examples.

EMBODIMENTS

The present invention is further illustrated by reference to the following example. Those skilled in the art will appreciate that other and further embodiments are obvious and within the spirit and scope of this invention from the teachings of this example, taken with the accompanying specification and drawings.

EXAMPLE 1

A continuous flow wet oxidation system of the type described herein and shown in relationship to FIG. 1 capable of processing about 1 to 10 gallons of influent waste water containing entrained organic matter per hour is prepared. This equipment is instrumented to record and control temperatures and pressures throughout the system. Influent waste water is continuously pumped into the system and compressed air is continuously added thereto. Effluent liquid water and effluent gas and water vapor are continuously vented from the system. Influent waste water entering the system is pumped through a counter flow tube-in-tube heat exchanger where its temperature is raised from room ambient to about 300° to 485° F. Electric heaters placed between such heat exchanger and the reactor raise and adjust the influent water temperature to a predetermined reactor temperature. Effluent water leaving the reactor is passed through the heat exchanger where it is cooled to just about room temperature ambient by the incoming influent stream. An automatic valve on the effluent line controls system pressure and allows the effluent to leave the system at ambient atmospheric pressure.

For evaluation of purposes a synthetic waste water influent is employed to insure reproducible and uniform influent waste loads for evaluation purposes. The formula for the synthetic waste is as follows:

TABLE I

| | |
|---|---|
| Starch (malto dextrin) | 134 grams |
| Peptone (Bacto Peptone, Difco) | 72 grams |
| Urea | 52 grams |
| Water (50 gallons) | 189 liters |

Reaction temperatures range from about 400 to 550° F. At start-up, the system is allowed to fill with clean water and is pressurized to an operating pressure of about 1600 to 1800 psig. At this point, the compressed air and heat are turned on and the system is allowed to come to temperature and pressure equilibrium. Next the influent is switched from clear water to synthetic waste water.

Effluent water samples are taken from the end of the system after the liquid has been cooled to about 100° F. in the heat exchanger and reduced to ambient atmospheric pressure by pressure control valve.

Most process parameters were held as constants throughout the system during an individual evaluation run. Air input is adjusted to about 125% of the stoichiometric requirement assumed for each reactor phase. The liquid flow rate ranges from about 2 to 8 gallons per hour.

Samples for chemical analysis are taken from the influent synthetic waste water and from the effluent oxidized water stream. Samples are analyzed for chemical oxygen demand (COD) using a Technicon II Autoanalyzer. COD provided a direct measurement of organic waste solids in the synthetic waste water and effluent water. Comparison of the influent COD with the effluent COD provided a measurement of percent COD removal by the system.

The following table shows COD removal results.

TABLE

| Ex. No. | Influent COD mg/l | 1st Stage Effluent | | 2nd Stage Effluent | |
|---|---|---|---|---|---|
| | | Temp. | COD Removal | Temp. | COD Removal |
| 1 | 10,800 | 495° F. | 85.7% | 555° F. | 98.6% |
| 2 | 23,000 | 512° F. | 91.3% | 565° F. | 99.2% |
| 3 | 45,000 | 505° F. | 92.7% | 558° F. | 99.1% |

Although various minor modifications may be suggested by those versed in the art, it should be understood that we wish to embody within the scope of the patent warranted hereon all such modifications as reasonably and properly come within the scope of our contribution to the art.

We claim as our invention:

1. A process for accomplishing wet oxidation comprising the steps of simultaneously and continuously
   (A) charging a waste water composition containing entrained organic matter to a bottom region of a first vertically elongated reaction zone at a first flow rate,
   (B) charging an oxygen-containing gas to a bottom region of said reaction zone at a second flow rate, the amount of oxygen so charged in said gas being at least sufficient to accomplish at least about a 90% COD removal from said entrained organic matter, each of said waste water and said oxygen containing gas having been pre-heated to said zone temperature before said respective chargings,
   (C) maintaining said reaction zone at a zone temperature in the range from about 350° to 600° F. and at a zone pressure in the range from about 800° to 2200 psig,
   (D) separating in said first reaction zone a lower liquid phase from an upper gas phase,
   (E) removing gaseous effluent including spent gas from a top region of said reaction zone for increased reaction efficiency at a controlled rate sufficient to maintain said zone pressure,
   (F) removing aqueous liquid effluent from a middle region of said reaction zone at a controlled rate sufficient to maintain the level of said aqueous liquid effluent in said reaction zone within narrow, fixed limits above said middle region and below said top region, and
   (G) pre-pressurizing each of said waste water and said oxygen containing gas to said zone pressure before said respective chargings.

2. The process of claim 1 wherein said reaction zone is charged with a wet oxidation catalyst.

3. The process of claim 1 wherein said aqueous liquid effluent is charged into an end region of a plug flow reaction zone at a flow rate equal to the rate at which same is removed from said middle region and an oxygen containing gas is likewise charged into said end region at a selected flow rate and wherein a mixed gas and liquid phase effluent is withdrawn from an opposite end region of said plug flow reaction zone, there being in said plug flow reaction zone temperatures ranging from about 50° to 100° F. higher than, and pressures ranging from about 50 to 100 psig lower than, those respective temperatures and pressures being maintained in the preceding said reaction zone.

4. The process of claim 1 wherein said waste water contains from about 0.8 to 3 weight percent of organic matter on a 100 weight percent basis.

5. A process for accomplishing wet oxidation comprising the steps of
  (A) charging waste water and oxygen containing gas to a bottom region of a first vertically elongated reaction zone, said first reaction zone being maintained at a temperature ranging from about 350° to 600° F. and at a pressure ranging from about 800 to 2200 psig, said waste water and said gas being pre-heated and pre-pressurized to said temperature and said pressure,
  (B) separating in said first reaction zone a lower liquid phase from an upper gas phase,
  (C) removing gas from said upper gas phase at a controlled rate sufficient to maintain said pressure, and removing liquid from said liquid phase at a controlled rate sufficient to maintain a predetermined liquid phase level in said first reaction zone,
  (D) charging the liquid so removed from said first reaction zone and oxygen containing gas into one end of a plug flow type reaction zone which is heated to a temperature from about 50° to 100° F. higher than said temperature of said first reaction zone and which is pressurized to a pressure which is from about 50 to 100 psig lower than said pressure of said first reaction zone, and
  (E) removing admixed gas and liquid from an opposite end of said plug flow type reaction zone and placing such effluent into heat exchange relationship with said waste water and said oxygen containing gas before such are so charged to said first reaction zone.

6. An apparatus for continuous wet oxidation of organic waste matter comprising
  (A) a vertically orientable elongated reaction vessel including pressure relief means,
  (B) first tube means for delivering aqueous organic waste into one end region thereof,
  (C) second tube means for delivering input gas including oxygen into said one end region thereof,
  (D) means for maintaining a predetermined temperature in said reaction vessel,
  (E) flow control valve means for said first tube means,
  (F) pre-heated means associated with said first tube means for controllably pre-heating to said predetermined temperature said organic aqueous waste,
  (G) pre-pressurizing means for controllably pre-pressurizing to said predetermined value each of said organic aqueous waste and said input gas which pre-pressurizing means is associated with each of said first tube means and said second tube means, respectively, and
  (H) phase separation means within said reaction vessel for separate, independent, variable control of each of the liquid and vapor phases within said reaction vessel, and providing separate exits for the liquid and vapor phases comprising:
    third tube means for removing gaseous effluent from an opposite end region of said reaction vessel thereby to remove spent gas including carbon dioxide from said reaction vessel,
    pressure control valve means in said third tube means adjacent said reaction vessel for opening said third tube means at pressures in excess of a predetermined value for removal of spent gas from said reaction vessel, including pressure sensor means therefor,
    fourth tube means for removing aqueous liquid effluent from a middle region of said reaction vessel,
    fluid level sensor means for sensing within narrow limits a fluid level in said reaction vessel between said middle region and said opposed end region thereof and for generating a signal representative of instantaneous levels so sensed,
    effluent flow control valve means in said fourth tube means adjacent said reaction vessel, and
    control means responsive to said signals sensed by said level sensor means for operating said effluent flow control valve means responsively to levels sensed by said fluid level sensor,
  thereby to achieve optimum wet oxidation reaction rate and efficiency.

7. A multi-stage system for continuous wet oxidation of organic matter comprising in combination
  (A) a plurality of serially functionally interconnected reaction stages including a first reaction stage and a last reaction stage,
  (B) each of said stages, except the last stage of said plurality, incorporating gas/liquid phase separating reactor apparatus for separation of gas and liquid phases and venting of spent gas and carbon dioxide between each pair of serially connected stages with supply of fresh oxygen to the following stage,
  (C) each said phase separating reactor apparatus providing a separate reaction zone including
    (1) an elongated, generally vertically oriented pressurizable reaction vessel,
    (2) conduit means for delivering into a bottom region of said vessel each of process water and oxygen containing gas,
    (3) conduit means for removing from a top region of said vessel gas phase effluent therefrom, including reactor pressure control valve means therefor for removal of spent gas from said top region of said vessel and pressure sensor means for regulating operation of such valve in response to present pressures in said vessel,
    (4) conduit means for conveying from a middle region of said vessel liquid phase effluent therefrom, including reactor flow control valve means therefor and level sensor means for regulating operation of such valve in response to liquid preset levels in said vessel,
  (D) the last stage of said plurality of reaction stages incorporating a reactor apparatus which includes
    (1) a pressurizable reaction vessel,
    (2) conduit means for delivering into one end region of said vessel each of process water and oxygen containing gas,
    (3) conduit means for removing from an opposed end region of said vessel a mixed gas phase and liquid phase effluent,
  (E) heat exchanger means interconnected on one heat exchange side thereof across said conduit means for delivery of said first reaction stage whereby admixed process water and oxygen containing gas can flow therethrough and interconnected on the opposed heat exchange side thereof across said conduit means for removing of said reaction stage whereby admixed gas phase and liquid phase effluent can flow therethrough in countercurrent heat exchange relationship, (F) a last stage pressure control valve means in said conduit means for removing of said last reaction stage which valve means is located downstream from said heat exchanger means and pressure sensor means for regulating operation of such valve in response to present pressures in said conduit means for removing of said reaction stage downstream from said heat exchange means, (G) pump means, including conduit means, for charging starting process water into said conduit means for delivering of said first reaction stage upstream, (H) compressor means, including conduit means, for charging oxygen containing gas into each one of said conduit means for delivering at respective predetermined rates and at respective predetermined pressures, (I) interconnecting conduit means joining respectively each of said conduit means for conveying with the said conduit means for delivering of the next adjacent stage reactor apparatus downstream therefrom except for said last stage, and (J) heater means associated with each respective said reaction vessel and temperature sensor means for regulating temperature of each reaction vessel at the prescribed reaction temperature.

* * * * *